United States Patent
Cleeves et al.

(10) Patent No.: US 8,544,445 B2
(45) Date of Patent: Oct. 1, 2013

(54) OVER-COMPRESSED ENGINE

(75) Inventors: James M. Cleeves, Redwood City, CA (US); Nicholas Manov, Palo Alto, CA (US); Michael A. Willcox, Mountain View, CA (US); Simon David Jackson, Redwood City, CA (US)

(73) Assignee: Pinnacle Engines, Inc., San Carlos, CA (US)

( * ) Notice: Subject to any disclaimer, the term of this patent is extended or adjusted under 35 U.S.C. 154(b) by 615 days.

(21) Appl. No.: 12/720,457

(22) Filed: Mar. 9, 2010

(65) Prior Publication Data

US 2011/0220058 A1    Sep. 15, 2011

(51) Int. Cl.
*F02B 17/00* (2006.01)
*F02P 5/15* (2006.01)
*F02M 35/10* (2006.01)

(52) U.S. Cl.
USPC ....... 123/295; 123/305; 123/406.45; 123/306

(58) Field of Classification Search
USPC ................ 123/295, 299, 300, 305, 431, 435, 123/1 A, 27 R, 527, DIG. 12, DIG. 13, 406.23, 123/406.3, 406.32, 406.45, 406.47, 188.14, 123/306; 701/102–104, 111
See application file for complete search history.

(56) References Cited

U.S. PATENT DOCUMENTS

| | | | |
|---|---|---|---|
| 4,165,720 A | 8/1979 | Barcak | |
| 4,169,436 A | 10/1979 | Welch et al. | |
| 4,440,116 A | 4/1984 | Stevenson et al. | |
| 4,491,117 A | 1/1985 | Koide | |
| 5,878,714 A | 3/1999 | Dai et al. | |
| 6,125,801 A | 10/2000 | Mendler | |
| 6,502,533 B1 * | 1/2003 | Meacham | 123/3 |
| 6,915,776 B2 * | 7/2005 | zur Loye et al. | 123/304 |
| 7,128,062 B2 | 10/2006 | Kuo et al. | |
| 7,314,037 B2 | 1/2008 | Roithinger | |
| 7,658,183 B1 | 2/2010 | Johnson | |
| 7,770,545 B2 * | 8/2010 | Morgenstern | 123/3 |
| 2001/0017123 A1 | 8/2001 | Raab et al. | |
| 2002/0007816 A1 | 1/2002 | Zur Loye et al. | |
| 2004/0103860 A1 | 6/2004 | zur Loye et al. | |
| 2004/0149255 A1 | 8/2004 | zur Loye et al. | |
| 2005/0016496 A1 | 1/2005 | Hitomi et al. | |
| 2006/0225693 A1 | 10/2006 | Brachert et al. | |
| 2007/0227503 A1 | 10/2007 | Hitomi et al. | |

(Continued)

FOREIGN PATENT DOCUMENTS

DE    103 50 798 A1    5/2011

OTHER PUBLICATIONS

PCT international Search Report dated Jul. 6, 2011 for corresponding PCT Application No. PCT/US2011/027775.

*Primary Examiner* — Willis R Wolfe, Jr.
*Assistant Examiner* — Johnny Hoang
(74) *Attorney, Agent, or Firm* — Mintz Levin Cohn Ferris Glovsky and Popeo, P.C.

(57) ABSTRACT

A system and method are disclosed for fabricating and running an engine in two modes. The first mode is an efficiency mode having a high compression ratio and efficiency for low to medium loads. The second mode is a power mode having high power density for higher loads. The system may use a lean mixture in the efficiency mode, which mixture is made richer for more power in the power mode. The system may also use ignition timing to allow the efficiency mode and the high power mode to be at the same mixture.

19 Claims, 4 Drawing Sheets

(56) References Cited

U.S. PATENT DOCUMENTS

| | | |
|---|---|---|
| 2008/0000445 A1 | 1/2008 | Kim et al. |
| 2008/0208435 A1 | 8/2008 | Bryant |
| 2009/0159045 A1 | 6/2009 | Hitomi et al. |
| 2009/0173319 A1 | 7/2009 | Koch |
| 2010/0206251 A1 | 8/2010 | Poeschl et al. |
| 2011/0011061 A1 | 1/2011 | Yamakawa et al. |

* cited by examiner

Section B-B

OVER-COMPRESSED ENGINE

BACKGROUND

One factor affecting the efficiency of an internal combustion engine is the compression ratio at which the engine operates. Compression ratio is a ratio of the expanded to compressed volume of the engine combustion chamber, and is a measure of the degree to which an air/fuel mixture is compressed before ignition. A high compression ratio in a standard Otto cycle engine will result in the piston performing a longer expansion in the power stroke, and consequently more work, in comparison to the same engine running at a lower compression ratio. Compression ratios of gasoline powered automobiles using regular 87 octane gasoline typically range between about 8.5:1 and 10:1.

Compression ratios are limited by spontaneous ignition of the air/fuel mixture at high temperatures, a problem commonly referred to as either engine knock or auto-ignition. Engine knock occurs as a result of disassociation of the air/fuel mixture into more easily combustible fragments when the mixture is exposed to high temperatures for a sufficiently long period of time. The high temperature exposure can result in these fragments initiating an uncontrolled explosion outside the envelope of the normal combustion front during the power stroke of the engine. Engine knock causes audible and potentially damaging pressure waves inside combustion chamber. Knock is a subset of a more general auto-ignition. In this document we refer to auto-ignition as cases where the ignition happens independent of when the spark is fired, as in homogeneous ignition or a burn initiated by a surface ignition prior to the spark event.

Engine knock can be caused or contributed to by a variety of factors in addition to high compression ratios. Other factors include:
- the octane rating of gasoline used—low octane gasoline will spontaneously ignite at lower temperatures than high octane gasoline;
- hot wall temperatures with high surface-to-volume ratios, which tend to increase the heating of the air/fuel mixture;
- localized hot spots, such as around the exhaust valve, which may cause localized heating of the air/fuel mixture and knocking in the area of the hot spots;
- fast burn rate—high turbulence promotes good mixing and rapid burning of the fuel, which will reduce the likelihood of spontaneous ignition
- high inlet turbulence flow field turbulence also increases the temperature rise in the inlet air/fuel mixture which increases the likelihood of spontaneous ignition.
- mixture ratio—increasing the quantity of fuel in the mixture up to stoichiometric increases the energy released and hence the pressure and temperature of the end gas
- advanced timing can generate high peak pressures and temperatures.

Thus, the compression ratio, and consequently engine efficiency, in gasoline engines running the Otto cycle are limited by engine knock. Another factor affecting engine efficiency relates to pumping losses resulting from throttling (reduction) the air/fuel mixture. In the traditional Otto cycle, the air/fuel mixture supplied to the inlet manifold is throttled to run the engine at lower loads. Upon throttling the mixture, a negative pressure differential develops between ambient and the inlet manifold, and less air/fuel mixture is pulled into the combustion chamber from the inlet manifold upon the opening the inlet valve during the inlet stage. This increased pressure differential requires more pumping work to move the air/fuel mixture from the manifold to the combustion chamber. Thus, a traditional Otto cycle provides maximum efficiency when the throttle is completely open, a condition referred to as wide open throttle (WOT). Typical engines running the Otto cycle have lower efficiencies at lower loads, where pumping losses result from throttling.

The use of the Atkinson cycle instead of the standard Otto cycle is one known method of increasing the expansion ratio and efficiency at lower loads. FIGS. 1A and 1B show conventional pressure-volume graphs of ideal Otto and Atkinson cycles, respectively. FIG. 1A shows the stages of the standard Otto cycle: air/fuel inlet stage 50, isentropic compression stage 52, constant volume combustion stage 54, isentropic expansion stage 56, blowdown 58 and exhaust stage 60. As shown, the piston compresses the mixture during the compression stage 52 to the same degree that it expands during the power stage 56.

By contrast, the Atkinson cycle describes a method of engine operation where the effective air/fuel compression stroke is shortened relative to the power expansion stroke. This may be accomplished for example by keeping the inlet valve closed for a portion of the air/fuel inlet stroke, thus reducing the mass of the air/fuel mixture admitted for the compression stroke. Thus, as shown in FIG. 1B, the air/fuel mixture may be drawn in at stage 62 without a change in pressure until a volume $V_0$ of mixture is admitted. At that point, the inlet stroke may continue with no more mixture being admitted. The mixture is compressed during adiabatic stage 66, the mixture is combusted at constant volume in stage 68, the mixture adiabatically expands in the power stage 70, and the exhaust gas is withdrawn in stage 72. As seen, the expansion stage 70 is increased relative to the compression stage 66. The Atkinson cycle increases efficiencies at lower loads by getting more work out of an expansion stroke for a given compression ratio, but is not able to provide high power densities for high load engine operation.

Attempts have been made to run gasoline engines in the Atkinson cycle at low loads for its engine efficiency and in the Otto cycle at high loads for high power density. Such attempts include employing variable compression ratio (VCR) and variable valve timing (VVT) techniques to the engine. With VCR, the combustion chamber minimum volume is changed slowly compared with the piston motion. VCR by itself provides an engine that is both efficient at part loads and powerful at high loads. VCR can be combined with either a throttle or variable valve timing. Combining variable valve timing and variable compression allows Atkinson at low loads and Otto cycle at high loads.

With VVT, the inlet valve supplying the air/fuel mixture to the combustion chamber may for example be held open for a portion of the compression stroke. This allows a high geometric compression ratio, but as there is a smaller mass of the air/fuel mixture during the compression stroke, the temperature of the mixture is controlled by this lower effective compression ratio to prevent knocking. One example of an engine using VVT is the Prius made by Toyota Motor Corporation of Japan. It has the valve timing set so that the intake closes late at low power giving a 4:1 compression ratio while the expansion ratio is 12:1. At high power it changes the valve timing to get effectively a 9:1 compression ratio with the same 12:1 expansion ratio. However, VVT engines require more moving parts and complexity, and the late closing of the inlet valve negates the some of the benefits gained by avoiding pumping losses.

The majority of fuel consumed over the life of a vehicle is from low-load and idle regions. Because of mechanical friction, heat transfer, throttling and other losses, spark ignition internal combustion engines inherently have peak efficiency at high loads and poor efficiency at low loads. Matching an engine specification to a drive-cycle for purposes of vehicle MPG improvements requires shifting the peak efficiency towards the low loads.

Obtaining peak efficiency at low loads can be achieved, for example, by increasing the compression ratio. However, traditional octane fuel, MBT ignition advance, auto-ignition, and engine knock limit the power density (torque) an engine can achieve for a given compression ratio. It is therefore desired to provide an internal combustion engine which is capable of operating efficiently at low loads to maximize fuel economy, and capable of providing high power densities at high loads while avoiding the problems of the prior art solutions discussed above.

SUMMARY

An embodiment of the invented technology relates to a method of fabricating an internal combustion engine including the step of configuring the engine to run in an efficient mode where compression ratio of the combustion chamber is at least in part determined by a maximum compression ratio attainable with a lean air/fuel mixture at wide open throttle and maximum brake torque timing that is knock resistant and auto ignition resistant for a given octane fuel.

Another embodiment would be to optimize the compression ratio for efficiency in drive cycle performance. Compression ratio is limited by stability of combustion at higher loads, maximum torque limitations, exhaust gas temperature, auto-ignition and noise vibration and harshness limits. This method is independent mixture and so can be used with current three way catalyst operation requiring stoichiometric operation across all operating conditions of the engine. MBT may not necessarily be reached even at part throttle conditions.

A further embodiment of the invented technology relates to a method of fabricating an internal combustion engine, comprising the step of configuring the engine to run in an efficient mode where compression ratio of the engine is determined by controlling each of i) air/fuel ratio, ii) a turbulence with which the air/fuel mixture is admitted to the combustion chamber, iii) ignition timing, and iv) a temperature of the walls defining the combustion chamber. This embodiment further includes the step of configuring the engine to run in a power mode capable of delivering more power than the efficient mode. The power mode uses a richer air/fuel ratio than the efficient mode and retards the ignition timing used in the efficient mode. This embodiment further includes the step of determining when a changeover threshold is reached to transition between the efficient mode and power mode.

DETAILED DESCRIPTION

The invented technology will now be described with respect to FIGS. 2-4, which in general relate to an internal combustion engine, and a method of its operation, so that it runs efficiently at low and moderate loads and has a high power density at high loads. In general, the invented technology is based on maximizing efficiency at engine operating regions which consume the most fuel. Tests on a 250 cc single cylinder engine with 15:1 compression ratio using 87 octane gasoline have shown this region to be at low to moderate engine loads, such as for example below 6 bar BMEP.

In accordance with embodiments of the invented technology, for low to moderate engine loads, for example up to about 6 bar BMEP, the engine is run in an "efficiency mode" at maximum brake torque (MBT) timing at all throttles including WOT, with a lean air/fuel mixture. In the efficiency mode, the engine may be run with compression ratios of around 15:1 for normal 87 octane gasoline operation. This compression ratio would require the spark to be further retarded in a conventional engine, thus limiting the efficiency. However, the engine of the invented technology includes several features enabling compression ratios in this range without engine knock. These features include relatively low burn temperature from a lean air/fuel mixture, fast burn times from the turbulence of the incoming air/fuel mixture, and/or a combustion chamber relatively devoid of hot spots. These features are explained in greater detail below. The high compression ratio, relatively low burn temperature and open throttle yield highly efficient engine operation at these low to mid level loads where the most fuel is consumed during drive cycle operation.

The high turbulence, fast burn, knock resistant combustion chamber allows higher compression ratios to be used even when using stoichiometric mixtures and this over compressed methodology.

For loads above the maximum obtainable in lean operation, the engine is run in a "power mode," where the air/fuel ratio is decreased to provide a richer mixture and more power to the engine. Attributes of the engine are controlled at these higher pressures to prevent knocking, including adjusting the timing of the spark ignition to be later than the MBT timing. Changeover between efficiency mode and power mode may occur for example at 6-7 bar BMEP. However, with technology changes, such as for example how to move more air into the engine, the transition may happen at a higher BMEP. Emissions or other constraints could cause the transition to be done at lower BMEP. These and additional features of the invented technology are explained in greater detail below.

Figure 1A:
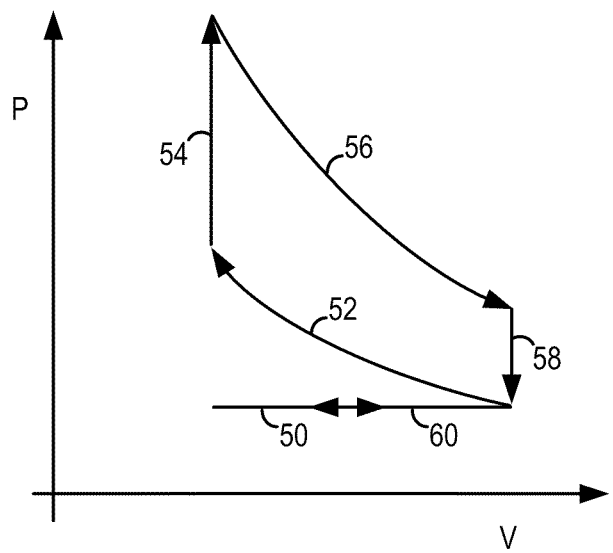
FIGS. 1A and 1B are graphs of conventional stages of an ideal Otto cycle and ideal Atkinson cycle, respectively.
Figure 1B:
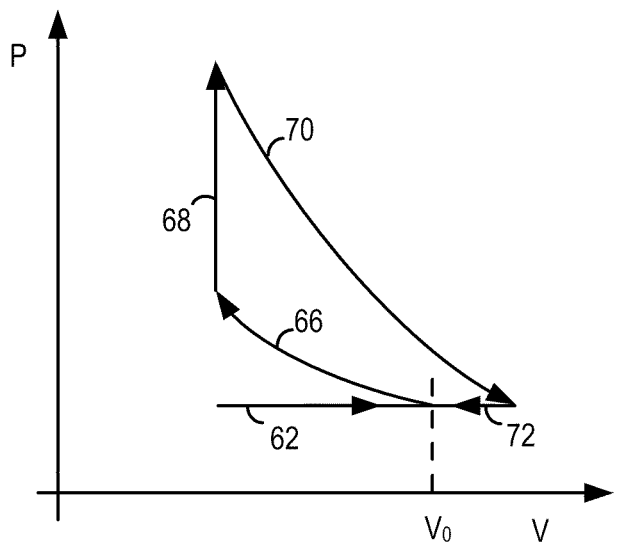
Figure 2:
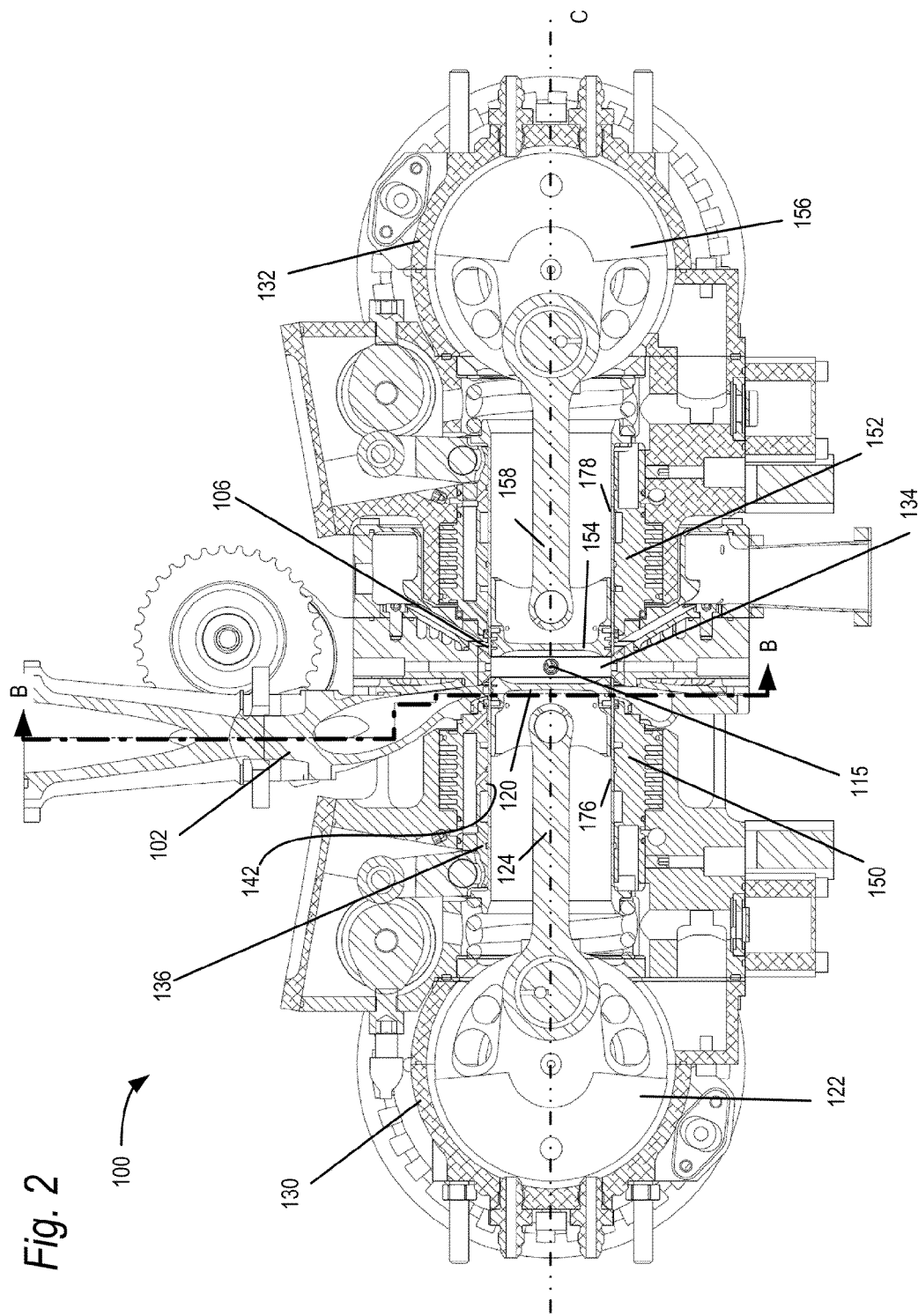
FIG. 2 depicts a front cross-sectional view of an internal combustion engine for use with the invented technology.

Referring initially to FIG. 2, there is shown one embodiment of an internal combustion engine 100 capable of implementing the invented technology. Further details of this engine are set forth in U.S. Pat. No. 7,559,298, entitled "Internal Combustion Engine," which is assigned to the owner of the present invention and which is incorporated by reference herein in its entirety. However, in general, the engine 100 includes a first piston 120 and second piston 154 reciprocating along a common centerline C within a common cylinder 142. It is understood that engine 100 may include additional piston assemblies having a design and operation similar to first and second pistons 120, 154. Moreover, while pistons 120, 154 reciprocate along a common axis in conjunction with each other, it is understood that engine 100 may alternatively include piston arrangements that are not coaxial in further embodiments as explained in greater detail below.

First piston 120 is connected to connecting rod 124, which drives and is driven by crankshaft 122. Second piston 154 is connected to connecting rod 158, which drives and is driven by crankshaft 156. First piston 120 reciprocates within cylinder 142, and is slidably movable to the left and right along an inner surface of a first sleeve valve 176. Second piston 154 also reciprocates within cylinder 142, and is slidably movable to the left and right along the inner surface of a second sleeve valve 178.

FIG. 2 illustrates the first and second pistons 120 and 154 at ignition, when the size of the combustion chamber defined by the internal volume of cylinder 142 between the pistons 120, 154 is at its smallest. Typical combustion chambers have a sealed chamber defined by the cylinder walls, the piston at one end and the cylinder head at the other end. It is a feature of the engine 100 that the cylinder heads which are typically provided in conventional engines may be omitted in engine 100. The combustion chamber is instead defined in cylinder 142 walls, first piston 120 at one end and second piston 154 at the opposite end. Moreover, the diameter of the pistons 120, 154 is smaller than conventional pistons. The omission of separate cylinder heads and smaller piston diameter provide a low surface area to volume ratio within the combustion chamber.

In general, it is desirable not to lose heat through the walls defining the combustion chamber, as this heat could otherwise contribute to the work performed by the pistons during their power stroke. One advantage of the opposed piston arrangement of engine 100 is that, by having a low surface area to volume ratio, the surface area of the combustion chamber through which heat may escape is minimized. The combustion chamber in this case is defined by the piston(s) and chamber walls at top dead center. As a result, the engine 100 is impacted less by the increased heat transfer from the high velocity gas than a conventional engine.

In some embodiments, first and second pistons 120, 154 comprise low conductivity material because the pistons 120, 154 in engine 100 are smaller in diameter than a piston in a traditional engine. By way of example only, low conductivity material may include cast iron. Using a low conductivity material for first and second pistons 120, 154 allows more of the heat generated in the combustion event to be retained in the gas and is therefore available to do work.

In conventional engines, in addition to adding to the surface area of the combustion chamber, the cylinder heads house the inlet and exhaust poppet valves. During combustion, these valves define localized hot spots in the combustion chamber, possibly reaching temperatures approaching 650° C. As explained in the Background of the Invention, localized hot spots can be a significant contributing factor to engine knock. Another feature of engine 100 is that conventional inlet and exhaust valves are omitted, and instead replaced by a port 104 covered by annular sleeve valve 176, and an exhaust port 106 covered by an annular sleeve valve 178. The sleeve valve 176 reciprocates to open and close the inlet port. The sleeve valve 178 reciprocates to open and close the exhaust port. Further details of the inlet valve, exhaust valve and sleeve valves are disclosed in the above-incorporated U.S. Pat. No. 7,559,298, but of relevance is that the inlet and exhaust valves do not define localized hot spots within the combustion chamber. They remain mostly hidden by the piston crown near TDC and are also maintained at temperatures that are typically below 400 C. These relatively low temperatures reduce heat transfer to the air/fuel mixture, thus increasing knock margin and enabling a higher compression ratio.

Moreover, while heat transfer through the walls is undesirable, it is important to maintain the walls at low enough temperature so that the wall temperature does not result in spontaneous ignition of the end gas (i.e., the last of the gas to combust) during burn. The engine 100 accomplishes this by a cooling fluid circulating around the sleeve valve 176 to remove heat. Further details of this cooling system are disclosed in the above-incorporated U.S. Pat. No. 7,559,298, but in general, a cooling fluid is pumped through helical grooves in an outer surface of the sleeve portion 176. Heat convects from the sleeve portion 176 to the cooling media, and is removed by the cooling media from the system. In embodiments, the temperature of all surfaces within the combustion chamber may be heated to a temperature no higher than that of a conventional piston crown during the combustion cycle, which may for example vary between 250° C. and 350° C., and may further be for example 300° C.

The first and second castings 130, 132 are mounted to a center connecting piece 134, which is in the form of a ring. Center connecting piece 134 includes spark plug access 115 through which spark plugs can be inserted. FIG. 2 also illustrates a coolant-path defining pieces 150 and 152. Sleeve valve 176 is slidably movable to the left and right (from the FIG. 2 perspective) relative to coolant-path defining piece 150. Sleeve valve 178 is slidably movable to the left and right (from a FIG. 2 perspective) relative to oil-path defining piece 152.

Figure 3:
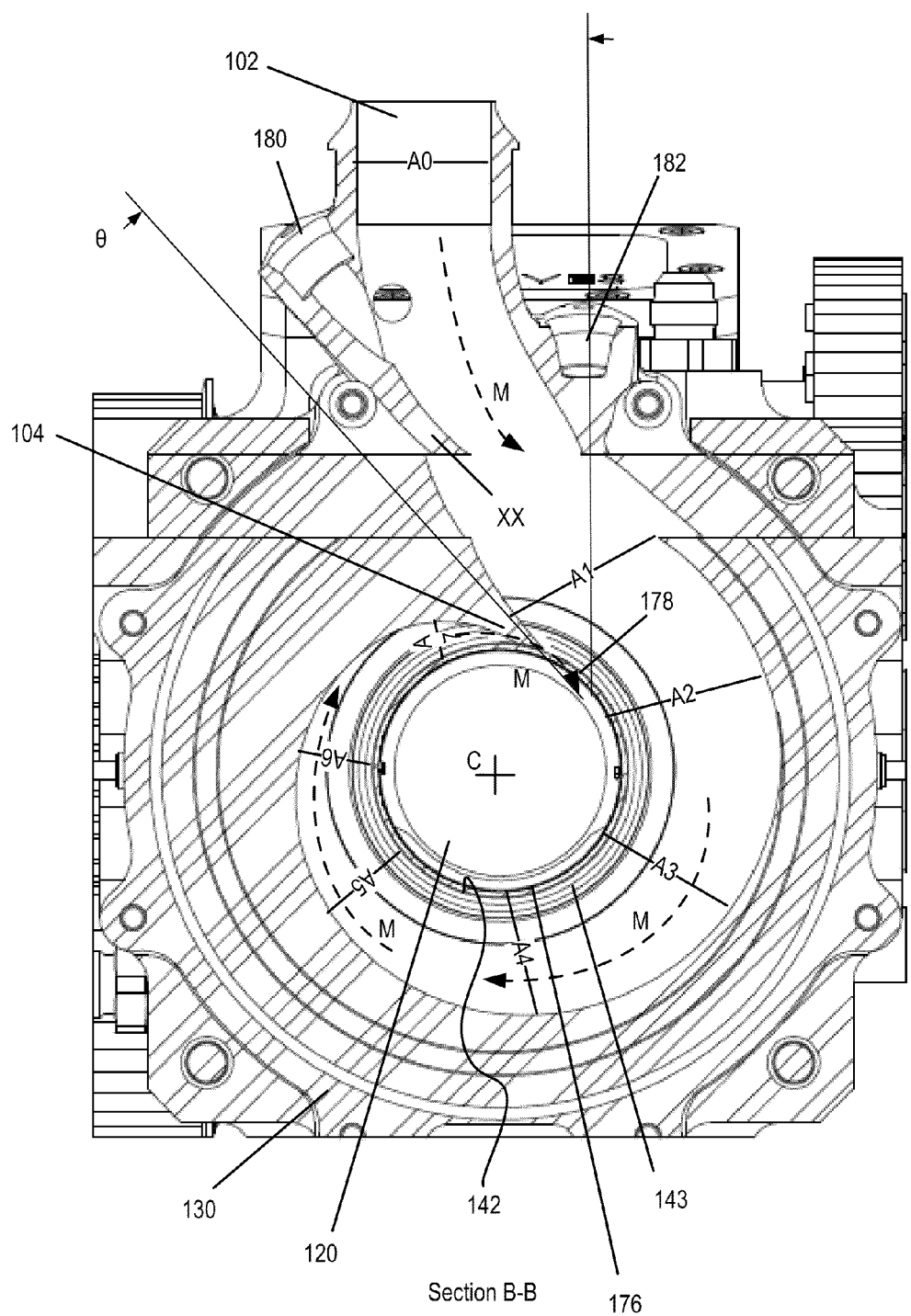
FIG. 3 depicts a side cross-sectional view of the internal combustion engine shown in FIG. 2 along cut line B-B.

FIG. 3 is a cross-sectional view of engine 100 shown in FIG. 2 along cut line B-B. FIG. 3 illustrates a swirl port 104 having an entry port 102. The air/fuel mixture M enters port 102, travels along port 104 and then flows into and around cylinder 142 in order to create a rapid rotational flow in cylinder 142 during the inlet stroke. The combination of the tangential arrival and admitting the mixture at the periphery of the cylinder results in a rapid rotational flow field and controlled turbulence inside the cylinder during the inlet stroke. This turbulent flow persists through the cycle such that when the mixture is ignited, the flame is quickly swept across the combustion chamber resulting in a very rapid and very reproducible combustion event.

The sleeve valve 176 is particularly good for this because it allows entry of the mixture into the cylinder around the whole periphery of the cylinder. Traditional valves (e.g., a poppet valve) only allow this to happen around the inlet valve which at its largest is a little over one-half the diameter of the cylinder. This equates to lower pumping losses for the sleeve valve as a similar rotational flow motion can be achieved for less piston work.

FIG. 3 illustrates that the mixture M exits port 104 and enters cylinder 142 along the periphery of the cylinder wall. The cross-sectional areas A1-A7 of the port 104 become progressively smaller as the mixture M travels through the port towards cylinder 142. The decreasing cross-sectional area of port 104 causes the flow of mixture M to enter cylinder 142 along the cylinder wall and swirl toward the central axis C of cylinder 142. The principle of conservation of momentum results in an even faster rotation of mixture M at the center C of cylinder 142 than the rotational velocity of mixture M when it first entered cylinder 142. FIG. 3 illustrates that rotation of mixture M is about central axis C that runs longitudinally through the geometric center of the piston (see FIG. 2).

Given this configuration, mixture M is pulled helically towards the center C into the low pressure region created by a piston's downward stroke. The exit of port 104 introduces high velocity mixture along the cylinder 142 as the retracting piston(s) pulls the mixture into the cylinder. This induces inwards motion towards center C to increase the rotational velocity of mixture M within cylinder 142. In contrast to this arrangement, a mixture exiting a conventional poppet valve is introduced substantially into the center of a cylinder and the velocity of the mixture decreases as it expands towards the cylinder wall. Poppet valve engines incorporating port or valve induced turbulence as large as the sleeve valve do so at a greatly increased pressure drop across the valve.

The swirl rate of mixture M in cylinder 142 may vary. A high swirl rate increases heat transfer through the walls of the combustion chamber. However, a high swirl rate also promotes rapid burning of the air/fuel mixture. This is significant in that engine knock is a function of both temperature and time. Even though the combusted mixture may reach temperatures where knock may otherwise occur, the turbulence of the inlet mixture may prevent this knock by burning more quickly than the time required for spontaneous ignition. This increase in knock margin may further enable the higher compression ratios in the efficiency mode. The tradeoff between the heat transfer promoted by the turbulent inlet mixture and the knock resistance may be balanced and optimized for different engines.

The swirl rate of mixture M within cylinder 142 may be adjusted by changing the cross-sectional area A1 of port 104. In some embodiments, a mean port flow velocity of mixture M traveling through port 104 is 90 msec. The term "mean port flow velocity" indicates an arbitrary nominal average velocity of the air as it travels through the port 104. The mean flow velocity of mixture M within port 104 may vary. This could result in mixture M swirling in cylinder 142 approximately six times faster than the crankshaft speed (e.g., in a small bore engine).

The swirl in cylinder 142 is proportional to the cross-sectional area of port 104. If the cross-sectional area A1 of port 104 is increased, the tangential velocity of mixture M entering cylinder 142 is reduced. Accordingly, the rotation speed of the swirl of mixture M is also reduced. The angle that mixture M enters the cylinder 142 changes with its tangential velocity. High tangential velocities result in a shallow angle, lower velocities result in a steeper angle. Shallow angles reduce the effective valve open area limiting the maximum flow through the valve. Additionally, inlet swirl port 104 is designed so that the tubular section of the port 104 approaches the valve at the angle that the flow is expected to cross the valve opening. A design with high swirl would have a lower maximum mass flow and a more tangential arrangement of the port 104 as it approaches the valve. Correspondingly a lower swirl port 104 would have a larger maximum flow and a steeper approach to the valve.

FIG. 3 further illustrates that the exit of port 104 forms an angle θ for the mixture M entering cylinder 142. In some embodiments, angle θ may be 90° with the flow arriving from a single quadrant. In this way, turbulence may be induced by introducing a tumbling motion to the flow instead of a swirling motion. However, the angle θ may range between 90° and tangential in embodiments, and the flow may be from more than one quadrant in embodiments. FIG. 3 illustrates that entry port 102 of port 104 includes a slight bend (e.g., is non-linear). The entry port 102 of port 104 is designed to preferably force fuel droplets (injected into port 102 by fuel 180, 182) to impinge on the hot sleeve surface of sleeve valve 176 as these fuel droplets enter the port 104 at section A1.

In some embodiments, the port 104 has a diameter of 24.9 mm (55 mm-22.5 mm). Using this example, the area of the port 104 is 486 $mm^2$ which, when airflow within port 104 is scaled against mean piston speed and cylinder volume, provides an air velocity of approximately 90 m/s for a 250 cc engine running at 4000 rpm. These dimensions are exemplary, and are not intended to limit the scope of the technology described herein. These dimensions and values will change with different engine configurations and design requirements.

The above description provides features of engine 100 which enhance aspects of the operation of the engine per the invented technology as explained hereinafter. However, it is understood that the invented technology may be used to operate a wide variety different engines in which one or more of the above-described aspects of engine 100 may be omitted.

In accordance with the present technology, an engine for example as described above may run in two modes: an efficiency mode at low and moderate loads, and a power mode for higher loads. In conventional engines running per the Otto cycle, compression ratio is set by determining what the maximum ratio can be while producing maximum power at wide open throttle and MBT spark timing without producing knock. As explained in the Background section, this is currently as high as about 10:1 for an engine running on standard 87 octane gasoline.

Embodiments of the invented technology make use of several attributes to enable higher compression ratios than that found in the prior art for the same engine running on the same fuel for a given knock level. In embodiments of a gasoline engine using 87 octane gas, the invented technology may attain a compression ratio of approximately 15:1 at MBT spark timing without knocking. It is understood that the compression ratio attainable in the efficiency mode of the invented technology may be higher or lower than that in further embodiments.

One factor contributing to the high knock margin and compression ratio is the turbulence induced as the air/fuel mixture is introduced into the cylinder during the inlet stroke. As indicated above, the turbulence in the air/fuel mixture promotes rapid burning of the mixture. Rapid burning increases engine efficiency in that short burn durations allow the energy released from the fuel to act on the piston for a longer portion of the stroke, thereby producing more work than a slower burning combustion event. In embodiments, the enhanced turbulence may allow lean mixtures to burn as quickly as stoichiometric mixtures in a less turbulent environment. Stoichiometric mixtures with enhanced turbulence burn more quickly. It is understood that completion of the burn may be earlier or later than that in the efficiency mode in further embodiments. The determination of MBT timing in the efficiency mode may be determined in a known manner based at least in part on air flow, engine load, speed, mixture ratio, turbulence and a given type of fuel.

Additionally, the short burn duration minimizes the amount of time the end gas spends at high temperature. This reduces the likelihood of knock and allows an increase of the compression ratio above that found in conventional systems.

Another factor reducing knock and increasing the compression ratio is the reduction in hot spots within engine 100 relative to engines having poppet valves. As discussed in the Background section, hot spots within the combustion chamber can create localized knocking, and the compression ratio of conventional engines must be adjusted downward to account for this. As the engine 100 does not have poppet valves and has fewer hot spots than conventional engines, the compression ratio may be adjusted upward to account for this factor. This applies to traditional poppet valves, but active cooling or material changes could change this dramatically.

Another factor contributing to the high compression ratio is the relatively cool surface temperatures of the walls around the combustion chamber. In particular, one embodiment of engine 100 includes walls that are cooled by a cooling fluid flowing around the combustion chamber as described above. The relatively cool walls prevent the end gas from spontaneously igniting during the combustion process, thus allowing a further improvement in the compression ratio.

In addition to the features described above for improving the compression ratio, other factors may be employed in the efficiency mode to improve efficiency at low to mid range load requirements. One such additional factor is the use of a lean air/fuel mixture, i.e. one having a higher air/fuel ratio than stoichiometric. As discussed above, in order to reduce power, conventional engines throttle the air/fuel mixture, resulting in pumping losses across the throttle reducing engine efficiency. However, the same effect of reduced power may be achieved by running at WOT using a lean air/fuel mixture, without pumping losses or a negative impact on efficiency. The lean mixture also allows an increase in the compression ratio, as lean mixtures burn at lower temperatures and pressures.

Using a lean mixture has additional benefits. The lower temperature burn results in lower heat differential and losses through the chamber walls at a given load at a given speed. Use of a lean mixture also results in less fuel being burned. Consequently, the burnt gasses act more like diatomic $N_2$ than tri-atomic $CO_2$ and $H_2O$. Diatomic gasses have higher specific heat ratio than tri-atomic gasses, which gives lean mixtures inherently higher thermodynamic efficiency. The gasses resulting from burning lean mixtures also have lower exhaust hydrocarbon emissions than those found in stoichiometric and rich mixtures. A still further benefit to the lean mixture is that it produces low levels of NOx, for example 10% of the normal emission levels. For light vehicles, the NOx levels are low enough to not require after-treatment to meet Euro 4/5 emission specifications. Running very lean mixtures may cause problems with the flammability of the air/fuel mixture. However, it is contemplated that engine parameters such as high compression ratio, turbulence and combustion chamber wall temperatures may be optimized to allow a good burning mixture which is sufficiently lean to meet the emissions specifications for all vehicles.

The air/fuel ratio may be controlled by a carburetor (not shown) of engine 100 to some predetermined level. When operating below 6 bar BMEP, embodiments of the efficiency mode may use air/fuel mixtures having 1.5 times the amount of air than in a stoichiometric ratio. However, it is understood that this amount of air in the lean mixture may not be constant with operating conditions, and be greater or lesser than 1.5 in further embodiments with the constraint that the air/fuel ratio be within a range that may be reliably ignited.

At moderate compression ratios, the density of the mixture at spark initiation is generally too low to support reliable combustion of a very lean mixture. However, because the invented technology allows a high compression ratio, the density is higher and the invented technology is able to run with a leaner mixture, for example 1.5 to 1.6 time as much air. The mixture may be leaner than that in further embodiments. Large natural gas engines use heavy turbocharging to get density up high enough to run over 2 times as much air as needed. The invented technology is able to achieve the above mentioned high densities without the turbo cost and complexity. One drawback to the use of lean mixtures is a resulting low power density. However, as explained below, for high loads, for example above 6 bar BMEP, the invented technology may step or gradually increase to a richer mixture approaching and/or exceeding stoichiometric.

Another factor improving efficiency is the reduced surface area within engine 100 relative to engines having cylinder heads. The smaller surface area of the cool walls reduces the area from which heat is able to escape. This increases the heat available to do work in the system, with an accompanying increase in efficiency.

Each of the above-described features contributes to the enhanced efficiency of the invented technology. It is understood that any one of these features, by itself, would allow an increase in the compression ratio and/or efficiency of the engine in the efficiency mode. Thus, it is understood various features described above may be omitted in embodiments, and still result in an increased compression ratio and/or efficiency. For example, while the removal of hot spots and the maintenance of the walls at cool temperatures contribute to an increased compression ratio and efficiency, one or both of these features may be omitted in an alternative embodiment of engine 100.

The same is true with the swirl inlet port to produce turbulence. Even without turbulence, embodiments of the invented technology would still enable a better compression ratio and efficiency than that attainable with the same engine and gasoline in the prior art. In embodiments, the invented technology may be used with a conventional engine and still result in an improvement of the overall engine efficiency. For example, each of the above-described components relating to surface temperature and turbulence may be omitted, and the engine efficiency may still be improved relative to the prior art by running a lean mixture at open throttle and MBT timing.

The converse is true as well. While running a lean mixture provides several advantages in the efficiency mode, embodiments of the efficiency mode may run with a richer mixture, such as for example a stoichiometric mixture. While potentially not as efficient as an embodiment with a lean mixture, the other engine factors described above would still result in an improvement in the compression ratio and efficiency relative to that found in the prior art.

In general, embodiments of the efficiency mode, running with a lean mixture at WOT and MBT spark timing together with the above-described engine attributes, produce a highly efficient engine operation at low and mid engine loads. Thus, the invented technology improves gas mileage in the regions which have been determined to consume the most fuel.

Figure 4:
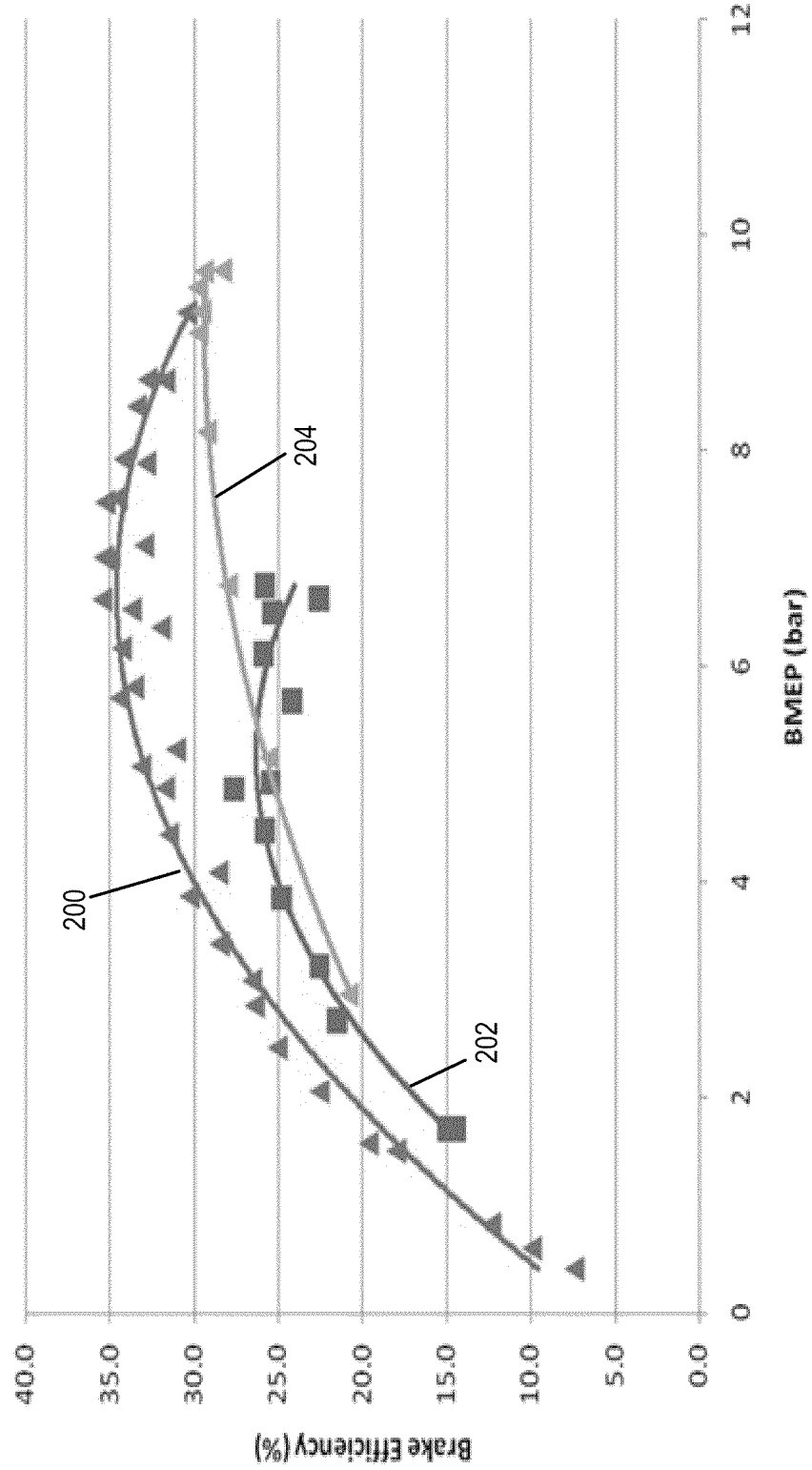
FIG. 4 is a graph of engine efficiency by the invented technology versus BMEP pressure.

FIG. 4 is a graph of engine efficiency plotted against brake mean effective pressure for three engines at normalized loads. Plot 200 is of an engine operating in the efficiency mode up to approximately 7 bar, according to the invented technology. Plots 202 and 204 are the efficiency curves for two other commercially available engines running by conventional methods. The plot 202 is of a commercial engine and plot 204 is of a different commercial engine, both single cylinder engines of similar size to the test engine. As seen, the plot 200 shows that the engine run in the efficiency mode of the invented technology attains a higher efficiency than the other engines across light to moderate loads.

As noted, the invented technology may run in the efficiency mode up to approximately 6-7 bar BMEP, at about which point the engine run per the invented technology exhibits an efficiency of about 35%. As seen in the graph, the efficiency levels start to tail off at mean pressures above 6 bar. However, the efficiency mode may be run up to engine pressures that are higher or lower than 6-7 bar BMEP in further embodiments. The efficiency mode may be of particular interest for passenger vehicle operations because full power is rarely achieved, and usually not for long durations. The point at which the invented technology switches from efficiency to power mode may be set by and in conjunction with a specific vehicle's drive-cycle, so that the engine runs in efficiency mode based on the vehicle's most common operating condition.

Once the engine 100 reaches some predefined changeover threshold where efficiency levels start falling off, for example at around 6 bar BMEP, the invented technology may switch engine modes of operation from the efficiency mode to the power mode. This switch may be done in a step fashion in a relatively short period of time (e.g., over one second or a fraction of a second), or the changeover may be done gradually over a longer period of time (e.g., over 3 to 5 seconds).

The changeover may be shorter or longer than that in further embodiments. The invented technology may switch the engine from power mode to efficiency mode in the same manner upon dropping back down below 6-7 bar BMEP. Determining an engine's BMEP is well known. Upon detecting engine pressures which cross the changeover threshold, a processor (not shown) controlling the operation of the engine 100 may affect the changeover. Alternatively, those of skill in the art will appreciate that the changeover may be triggered by purely or predominantly mechanical means upon crossing the predefined changeover threshold. The changeover of the mixture would also be dependent on the load required. For instance, an 8 bar load might be run at mixture part way between the lambda of the efficiency mode and the full power lambda needed for 9 bar in this particular engine (for instance, 1.5 lambda at efficiency 0.9 lambda at maximum power).

Once the changeover threshold is met, the invented technology makes certain changes to the engine attributes which allow the engine to run more powerfully at higher loads. In embodiments, one such change is the enrichment of the air/fuel mixture from a lean mixture to one that is richer. The richer mixture will release more energy, thereby producing the power needed at higher power densities. The air/fuel mixture may for example be provided at stoichiometric in the power mode. The air/fuel ratio may be higher or lower than stoichiometric in further embodiments (with the provision that it be richer than the lean mixture run in the efficient mode). As indicated above, the mixture may transition from the lean to the richer mixture in a quick step, or gradually over a period of time.

Given the high compression ratio at which the efficiency mode is run, enriching the mixture in the power mode may result in knock without other alterations to the system. Thus, in embodiments, in addition to enriching the mixture, the spark timing may be retarded (i.e., the spark may occur later in the combustion cycle, later crank angle, etc.) so that the peak pressures and temperatures within combustion chamber are kept below knock levels, even for a large compression ratio. By way of example only, manifold or venturi vacuum may be used to provide control of the ignition spark timing. Using manifold or venturi vacuum is known to one of ordinary skill in the internal combustion engine industry and therefore, further disclosure is not required.

As one example of the power mode, using a stoichiometric mixture to produce approximately 9 bar BMEP, spark timing may be set to within a couple degrees of TDC. This is made possible in part by the turbulent introduction of the air/fuel mixture, which, as noted above, results in a fast burn of the mixture. The increase of the fuel in the mixture further increases burn rate of the mixture. Thus, even starting within a couple degrees of TDC, most if not all of the mixture may be burned within 25° after TDC. It is understood that completion of the burn may be earlier or later than that in the power mode in further embodiments. And this late timing could reduce the efficiency while the power increases.

Ignition timing can be set late enough that a large fraction of the burn is taking place after TDC. As the burn proceeds, the pressure and temperature induced by the compression ratio continue to decrease as the combustion chamber becomes larger to mitigate against spontaneous ignition of the end gas. In this manner, knocking in the power mode may be avoided. Given the late spark, there is a slight loss of expansion ratio and efficiency in the power mode. For example, using 87 octane gasoline, running the engine at 9 bar BMEP peak power, stoichiometric mixture and spark timing resulting in burn completion at about 25° after TDC, the power mode may have an effective expansion ratio of about 12:1 or lower and an efficiency of about 30%. The 12:1 expansion ratio is still better than that achievable in prior art methods.

Given the rich mixture used in the power mode, the throttle may be closed partially to limit the power generated by the engine. At small amounts of throttle closure, the difference between pumping loss across the throttle and the losses in a valve timing controlled flow are minimal. So for power levels from 100% down to nearly 50%, the pumping losses in the power mode are minimal.

As indicated above, one problem with conventional engines is that they either run efficiently or powerfully, but not both, without the aid of expensive and complex variable compression ratio and variable valve timing techniques. The invented technology is able to achieve both efficient, and long expansion cycle-type operation at low to mid load levels and high power density, operation at high loads. The invented technology is able to accomplish this without the complexity and expense associated with variable compression ratio and variable valve timing techniques.

As noted, features of the engine 100 such as turbulent introduction of the air/fuel mixture and lower surface area to volume ratio make such an engine well suited to work with the invented technology. However, the methodology can be applied to conventional chambers as well. Two stroke engines typically do not have hot exhaust valves exposed, and with proper cooling design and turbulence, such engines could also be run in the above-described efficiency and power modes. Moreover, traditional four stroke engines could be modified to either significantly enhance the valve cooling, or ensure that the end gas region of the combustion chamber is cool. Both two and four stroke engines may further have the mixture turbulence optimized to be able get fast burn durations at lean mixtures without undue heat loss to the chamber walls.

Poppet valves can also be actively cooled to insure that they do not provide hot surfaces in the engine. Traditionally this has been done by adding sodium metal inside a valve stem cavity. But it could also be accomplished by flowing a coolant in and out of a hollow valve stem or hollow valve head and stem.

The above-described technology can also be used for conventional operation of higher octane fuels. Natural gas can be run with close to MBT timing at a geometric compression ratio of 15:1 also giving 35% peak efficiency. The invented technology could also be used with natural gas, likely requiring an 18:1 or greater compression ratio. For a dedicated natural gas engine, this may be fine, but most automotive applications where natural gas is used would like to be able to switch back and forth between natural gas and gasoline. With the engine set up using the lean over-compressed operation for gasoline and conventional operation with natural gas, both fuels can be used at 15:1 geometric compression ratio and only the ignition timing needs to be changed. With the addition of VCR operation, both fuels can be optimized.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. A method comprising:
   running an internal combustion engine in an efficient mode to provide power for a first engine load on the internal combustion engine, the efficient mode comprising providing a first air/fuel mixture that is lean and a first ignition timing that is approximately at a maximum brake torque timing; and
   transitioning from the efficient mode to a power mode to provide power for a second engine load that is larger than the first engine load and also larger than a maximum load achievable can be provided in the efficient mode with the internal combustion engine operating under a wide open throttle (WOT) condition, the power mode comprising providing a second air/fuel ratio that is less lean than the first air/fuel mixture and a second ignition timing that is retarded relative to the maximum brake torque timing.

2. The method of claim 1, further comprising inducting the air/fuel mixture into the combustion chamber in a controlled and turbulent manner, the turbulent manner increasing burn rate of the air/fuel mixture such that a compression ratio of approximately 15:1 is achievable and stable combustion is supported for lean air/fuel mixtures.

3. The method of claim 1, further comprising: maintaining all internal surfaces of a combustion chamber of the internal combustion engine at a temperature of between 200° C. and 400° C.

4. The method of claim 1, further comprising optimizing at least one of: i. air/fuel ratio, ii. a turbulence of the air fuel mixture in the combustion chamber, iii. ignition timing, iv. and combustion chamber wall temperature.

5. The method of claim 1, further comprising operating the internal combustion engine with a compression ratio of approximately 15:1 for an 87 octane gasoline.

6. The method of claim 1, wherein the transitioning from the efficient mode to the power mode occurs at approximately 6 bar BMEP.

7. The method of claim 1, wherein the first air/fuel ratio comprises approximately 1.5 times stoichiometric in the efficient mode and the transitioning comprises approaching the second air/fuel ration that comprises to stoichiometric or slightly rich in the power mode.

8. The method of claim 1, further comprising retarding timing of a combustion ignition spark to be later than maximum brake torque timing to prevent knocking in the power mode.

9. The method of claim 1, further comprising determining when to transition from the efficient mode to the power mode by a processor.

10. The method of claim 1, further comprising determining when to switch from the efficient mode to the power mode mechanically.

11. A method of fabricating an internal combustion engine, comprising the steps of:
   (a) configuring the engine to run in an efficient mode where compression ratio of the engine is determined by one or more of the following steps during the efficient mode:
      i. setting the air/fuel mixture to be a lean mixture at wide open throttle;
      ii. inducting the air/fuel mixture into the combustion chamber in a turbulence inducing manner;
      iii. maintaining a temperature of all walls defining the combustion chamber to a temperature not exceeding a temperature of a piston crown of a piston reciprocating within the engine;
      iv. acceptable levels of knock; and
      v. drive cycle performance; and
   (b) configuring the engine to run in a power mode in which more power is delivered than in the efficient mode with the engine operating at wide open throttle, a transition from the efficient mode to the power mode being accomplished by changing the air/fuel ratio to a more rich mixture than the lean mixture and retarding timing of a combustion ignition spark.

12. The method of claim 11, wherein the lean mixture has an air/fuel ratio of approximately 1.5 times stoichiometric.

13. The method of claim 11, wherein the temperature is less than approximately 400° C.

14. The method of claim 11, wherein the maintaining the temperature of all walls comprises preventing localized hot spots at an inlet valve through which the mixture enters the combustion chamber and at an exhaust valve through which the mixture exits the combustion chamber.

15. The method of claim 11, wherein the compression ratio of the engine is determined to be 15:1 for an 87 octane gasoline in the efficient mode.

16. The method of claim 15, wherein an effective expansion ratio of the engine is determined to be 12:1 for an 87 octane gasoline in the power mode.

17. The method of claim 11, wherein combustion of the air/fuel mixture is substantially completed at 15 crank angle degrees past TDC during a power expansion stroke of the engine in the efficient cycle.

18. The method of claim 17, wherein combustion of the air/fuel mixture is completed at 25 crank angle degrees past TDC during a power expansion stroke of the engine in the power cycle.

19. An internal combustion engine, comprising:
   a combustion chamber at least partially defined by wall of a cylinder and having one or more internal surfaces;
   at least one piston moving within the cylinder; and
   one or more control devices that cause the internal combustion engine to run in an efficient mode to provide power for a first engine load on the internal combustion engine, the efficient mode comprising providing a first air/fuel mixture that is lean and a first ignition timing that is approximately at a maximum brake torque timing, the one or more control devices causing the internal combustion engine to transition from the efficient mode to a power mode to provide power for a second engine load that is larger than the first engine load and and also larger than a maximum load achievable can be provided in the efficient mode with the internal combustion engine operating under a wide open throttle (WOT) condition, the power mode comprising providing a second air/fuel ratio that is less lean than the first air/fuel mixture and a second ignition timing that is retarded relative to the maximum brake torque timing.

* * * * *